US009852658B2

(12) United States Patent
Lavigueur et al.

(10) Patent No.: US 9,852,658 B2
(45) Date of Patent: Dec. 26, 2017

(54) SYSTEM FOR MOVING AN ANATOMICAL MODEL OF A FETUS INSIDE A MANNEQUIN HAVING A BIRTH CANAL AND A CHILDBIRTH SIMULATOR

(71) Applicant: CAE HEALTHCARE CANADA INC., Saint-Laurent OT (CA)

(72) Inventors: Maxime Lavigueur, Quebec (CA);
Gary Halbert, Sarasota, FL (US);
Giuseppe Mallaci, Beaconsfield (CA);
Daniel Fernandez, St Petersburg (CA);
Francois Caron, Laval (CA)

(73) Assignee: CAE Healthcare Canada Inc., Saint-Laurent (CA)

( * ) Notice: Subject to any disclaimer, the term of this patent is extended or adjusted under 35 U.S.C. 154(b) by 160 days.

(21) Appl. No.: 14/231,452

(22) Filed: Mar. 31, 2014

(65) Prior Publication Data
US 2015/0004583 A1    Jan. 1, 2015

Related U.S. Application Data

(60) Provisional application No. 61/841,250, filed on Jun. 28, 2013.

(51) Int. Cl.
*G09B 23/28* (2006.01)
*G09B 23/30* (2006.01)
*G09B 23/32* (2006.01)
*G09B 23/34* (2006.01)

(52) U.S. Cl.
CPC .......... *G09B 23/281* (2013.01); *G09B 23/30* (2013.01); *G09B 23/32* (2013.01); *G09B 23/34* (2013.01)

(58) Field of Classification Search
CPC ...... G09B 23/30; G09B 23/281; G09B 23/32; G09B 23/34
USPC ................................. 434/262, 267, 272, 273
See application file for complete search history.

(56) References Cited

U.S. PATENT DOCUMENTS

| 451,675 A | * | 5/1891 | Klautsch | G09B 23/281 |
| | | | | 434/273 |
| 2,127,774 A | * | 8/1938 | Bay | G09B 23/281 |
| | | | | 434/273 |
| 2,813,371 A | * | 11/1957 | Tiebe | A63H 13/12 |
| | | | | 446/3 |

(Continued)

FOREIGN PATENT DOCUMENTS

| WO | 03/041034 A1 | 5/2003 |
| WO | 2013/103818 A1 | 7/2013 |

*Primary Examiner* — Melba Bumgarner
*Assistant Examiner* — Joseph B Baldori
(74) *Attorney, Agent, or Firm* — IP Delta Plus Inc.

(57) ABSTRACT

The present disclosure relates to a system for moving an anatomical model of a fetus inside a mannequin having a birth canal. The system comprises a descent mechanism and a rotation mechanism. The descent mechanism is integrated in the mannequin and can move an anatomical model of a fetus longitudinally towards the birth canal of the mannequin. The rotation mechanism is mounted to the descent mechanism and can rotate the anatomical model of the fetus. The model of the fetus is inserted in the rotation mechanism. Also provided is a childbirth simulator comprising a mannequin with a birth canal, and the aforementioned system integrated in the mannequin for moving an anatomical model of a fetus inside the mannequin.

18 Claims, 8 Drawing Sheets

(56) References Cited

U.S. PATENT DOCUMENTS

| | | | | |
|---|---|---|---|---|
| 3,199,229 | A * | 8/1965 | Easton | G09B 27/02 434/140 |
| 4,237,649 | A * | 12/1980 | Goldfarb | G09B 23/281 434/262 |
| 4,836,821 | A * | 6/1989 | Raymond | A63H 3/008 446/310 |
| 5,194,031 | A * | 3/1993 | Sahler | A63H 31/00 446/103 |
| 5,279,871 | A * | 1/1994 | Segan | A63H 18/04 428/18 |
| 5,376,037 | A * | 12/1994 | Finkbeiner | A63H 18/14 446/236 |
| 5,393,058 | A * | 2/1995 | Rowland | A63F 7/0628 273/108.22 |
| 6,132,287 | A * | 10/2000 | Kuralt | A63H 17/004 446/431 |
| 6,503,087 | B1 | 1/2003 | Eggert et al. | |
| 7,241,145 | B2 | 7/2007 | Riener et al. | |
| 7,811,090 | B2 * | 10/2010 | Eggert | G06F 19/3437 434/273 |
| 7,976,312 | B2 * | 7/2011 | Eggert | G09B 23/281 434/267 |
| 7,976,313 | B2 * | 7/2011 | Eggert | G06F 19/3437 434/267 |
| 8,016,598 | B2 * | 9/2011 | Eggert | G06F 19/3437 434/267 |
| 8,152,532 | B2 * | 4/2012 | Eggert | G06F 19/3437 434/267 |
| 8,197,259 | B2 | 6/2012 | Allen et al. | |
| 8,419,438 | B2 * | 4/2013 | Eggert | G06F 19/3437 434/268 |
| 8,636,624 | B2 * | 1/2014 | Liberman | A44C 9/003 16/110.1 |
| 8,678,832 | B2 * | 3/2014 | Eggert | G06F 19/3437 434/273 |
| 8,939,770 | B2 * | 1/2015 | Gonzalez Quinones | G09B 23/281 434/273 |
| 8,951,047 | B2 * | 2/2015 | Eggert | G06F 19/3437 434/273 |
| 9,004,922 | B2 * | 4/2015 | Eggert | G06F 19/3437 434/273 |
| 9,123,261 | B2 * | 9/2015 | Lowe | G09B 23/30 |
| 2005/0014115 | A1 * | 1/2005 | Riener | G09B 23/32 434/273 |
| 2006/0073456 | A1 * | 4/2006 | Allen | G09B 23/281 434/262 |
| 2007/0105083 | A1 | 5/2007 | Riener et al. | |
| 2007/0117077 | A1 * | 5/2007 | Gordon | G09B 23/28 434/262 |
| 2007/0122785 | A1 * | 5/2007 | Eggert | G06F 19/3437 434/272 |
| 2007/0172804 | A1 * | 7/2007 | Allen | G09B 23/281 434/273 |
| 2007/0218442 | A1 | 9/2007 | Dupuis et al. | |
| 2008/0138778 | A1 * | 6/2008 | Eggert | G06F 19/3437 434/262 |
| 2008/0146115 | A1 * | 6/2008 | Yamana | A63H 17/14 446/129 |
| 2010/0227303 | A1 | 9/2010 | Deering | |
| 2010/0304347 | A1 * | 12/2010 | Eggert | G06F 19/3437 434/266 |
| 2011/0311956 | A1 * | 12/2011 | Eggert | G06F 19/3437 434/272 |
| 2012/0214144 | A1 * | 8/2012 | Trotta | G09B 23/281 434/267 |
| 2012/0214145 | A1 * | 8/2012 | Eggert | G06F 19/3437 434/273 |
| 2013/0330699 | A1 * | 12/2013 | Eggert | G06F 19/3437 434/266 |
| 2014/0205983 | A1 * | 7/2014 | Eggert | G06F 19/3437 434/273 |
| 2014/0272877 | A1 * | 9/2014 | Carvajal | G09B 23/281 434/270 |
| 2015/0004583 | A1 * | 1/2015 | Lavigueur | G09B 23/281 434/267 |
| 2015/0004584 | A1 * | 1/2015 | Galibois | G09B 23/30 434/270 |
| 2015/0024365 | A1 * | 1/2015 | Schaefer | G09B 23/281 434/273 |
| 2015/0154888 | A1 * | 6/2015 | Eggert | G06F 19/3437 434/268 |
| 2015/0221237 | A1 * | 8/2015 | Eggert | G06F 19/3437 434/267 |

* cited by examiner

SYSTEM FOR MOVING AN ANATOMICAL MODEL OF A FETUS INSIDE A MANNEQUIN HAVING A BIRTH CANAL AND A CHILDBIRTH SIMULATOR

TECHNICAL FIELD

The present disclosure relates to the field of simulators. More specifically, the present disclosure relates to a system for moving an anatomical model of a fetus inside a mannequin having a birth canal, and to a childbirth simulator.

BACKGROUND

Simulators attempting to reproduce human body functions are used, for example, in the context of medical training. One very significant example of medical process that requires training is assistance to childbirth.

Obstetric emergencies are very rare. While the vast majority of deliveries can be handled with routine procedures, complications can occur, requiring clinical vigilance, rapid team response, and complex technical skills in order to assure normal maternal and fetal outcome. Opportunities for observing and managing such situations are scarce, and this poses great difficulties for training of labor ward staff.

Therefore, there is a need for devices that better emulate mechanisms of childbirth.

SUMMARY

According to a first aspect, the present disclosure provides a system for moving an anatomical model of a fetus inside a mannequin having a birth canal. The system comprises a descent mechanism and a rotation mechanism. The descent mechanism moves the anatomical model of the fetus longitudinally towards the birth canal of the mannequin. The rotation mechanism is mounted to the descent mechanism and rotates the anatomical model of the fetus. The anatomical model of the fetus is inserted in the rotation mechanism.

In a particular aspect, the descent mechanism comprises a frame, two parallel linear rails mounted on the frame, and a carriage travelling along the two parallel linear rails. The rotation mechanism is fixed to the carriage.

In another particular aspect, the rotation mechanism comprises a rotating ring. The rotating ring may be ovoid shaped and may be capable of rotating 360 degrees and above.

According to another aspect, the present disclosure provides a childbirth simulator. The childbirth simulator comprises a mannequin having a birth canal. The childbirth simulator also comprises the aforementioned system integrated in the mannequin for moving an anatomical model of a fetus inside the mannequin.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems of emulating mechanisms of childbirth.

The present disclosure introduces a childbirth simulator (CBS) that provides repeatable opportunities for healthcare providers to practice management of labor and delivery, with and without complications. A target audience for the CBS comprises students and professionals in the fields of obstetrics, midwifery, nursing, and emergency medical services. The disclosed CBS includes integrated physiologic models of mother and fetus, providing anatomical, biomechanical, and physiologic realism. The present simulator comprises mechanical, electrical, electronic and software components. No biological component is required in making the CBS. Consequently, in the present disclosure, mentions of fetus, human body and organs are primarily meant to designate anatomical models simulating or emulating biological counterparts.

The CBS comprises an instrumented mannequin in the shape of a full-term pregnant woman. The CBS is controlled by an instructor, through a software application. Other software applications emulate medical monitoring equipment for trainees. The CBS can present situations that occur during pregnancy, labor, delivery, and the postpartum period. Both vertex (head-first) and breech (buttocks-first) vaginal deliveries can be simulated, as well as Caesarean section.

TABLE 1

Feature summary of the Childbirth Simulator.

| Functional Area | Feature |
|---|---|
| Reproductive | Anatomically Correct Pelvis |
|  | Realistic Birth Canal and Genitalia |
|  | Leopold's Maneuvers |
|  | Fetal Heart Sounds |
|  | Automated Fetal Descent and Rotation |
|  | Vertex and Breech Delivery |
|  | Shoulder Dystocia |
|  | Vaginal Bleeding |
|  | Boggy/Contracted Uterus |
|  | Inverted Uterus |
| Baby | Fetal Head with realistic Fontanels |
|  | Palpable Fontanels and Sagittal Suture |
|  | Forceps Application |
|  | Vacuum Extractor Application |
|  | Fetal Head Traction Sensing |
|  | Umbilical Cord |
|  | Intact/Fragmented Placenta |

TABLE 1-continued

Feature summary of the Childbirth Simulator.

| Functional Area | Feature |
| --- | --- |
| Circulatory | Pulses |
| | Electrocardiogram (ECG) |
| | Electrical Therapy |
| | Chest Compression |
| | Intravenous (IV) Access |
| | Heart Sounds |
| | Sphygmomanometry |
| Respiratory | Airway |
| | Audible Breathing |
| | Basic Airway Management |
| | Bag and/or Mechanical Ventilation |
| | Lung Sounds |
| | Chest Excursion |
| | Exhalation and/or Inhalation |
| Nervous | Seizure |
| | Reactive Pupils |
| | Blinking |
| | Vocalization, Live and Prerecorded |
| Digestive and Urinary | Urinary Catheterization |
| Software | Integrated Physiological Models of Mother and Fetus |
| | Emulated Electronic Fetal Monitor |
| | Emulated Patient Monitor (PM) |

Figure 1:
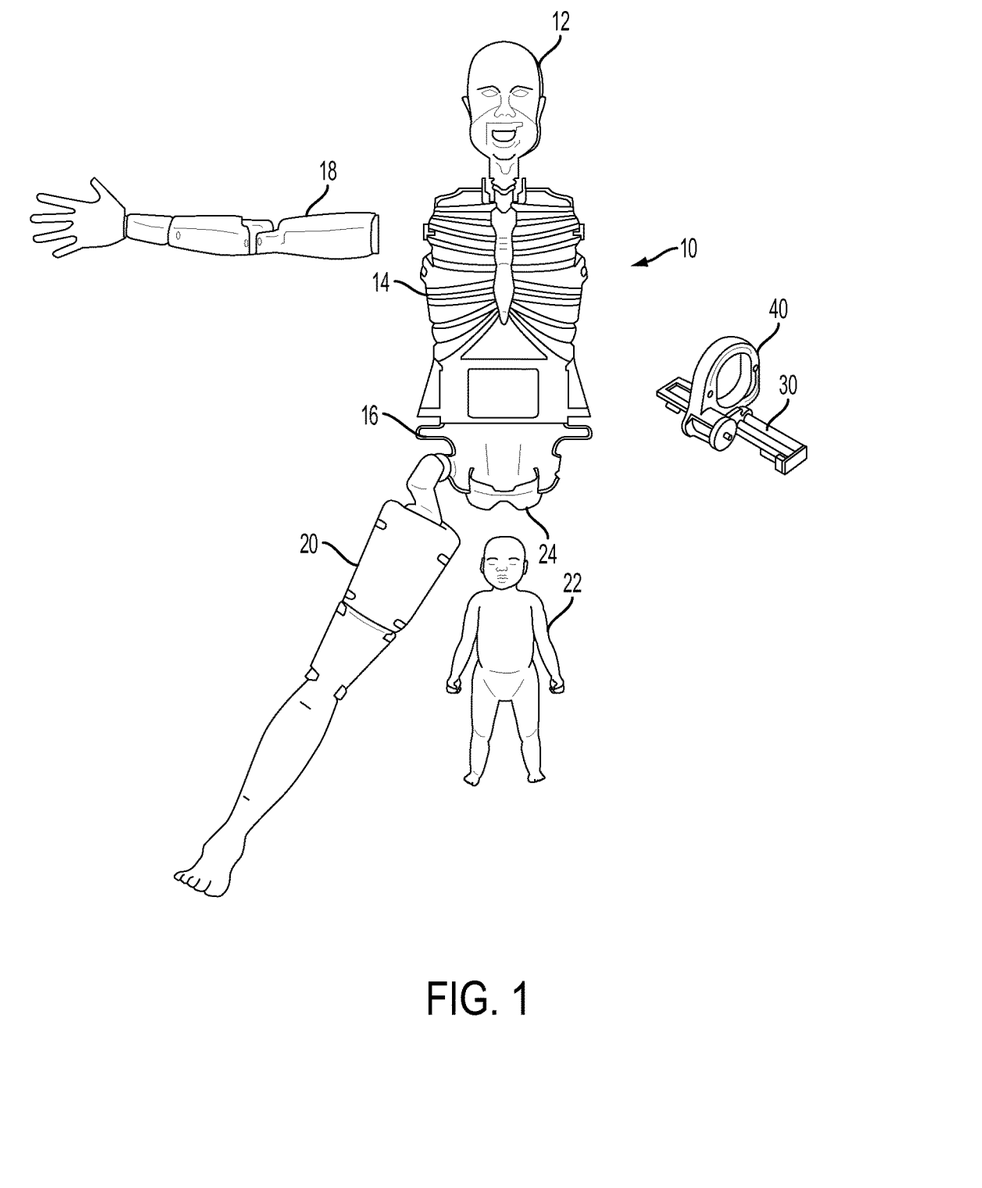
FIG. 1 is a partial, exploded front elevation view of a human body simulator including a childbirth simulator.

Referring now to the drawings, FIG. 1 is a partial, exploded front elevation view of a human model simulator incorporating a childbirth simulator. The CBS can be made part of a human body simulator (HBS) (not all components shown). The HBS comprises a mannequin 10 having a general female shape, including a head 12, a torso 14, a pelvis 16, arms 18 (only one shown), and legs 20 (only one shown). An anatomical model of a fetus 22 is also provided. The foregoing will simply refer to a 'fetus 22' for simplicity. The CBS comprises a descent mechanism 30 for initiating movement of the fetus 22 through a birth canal 24 of the pelvis 16, and a rotation mechanism 40 for causing fetal rotation. The descent mechanism 30 moves the fetus 22 through the birth canal, up to the passage of the shoulders of the fetus 22 out of the birth canal 24.

Figure 2:
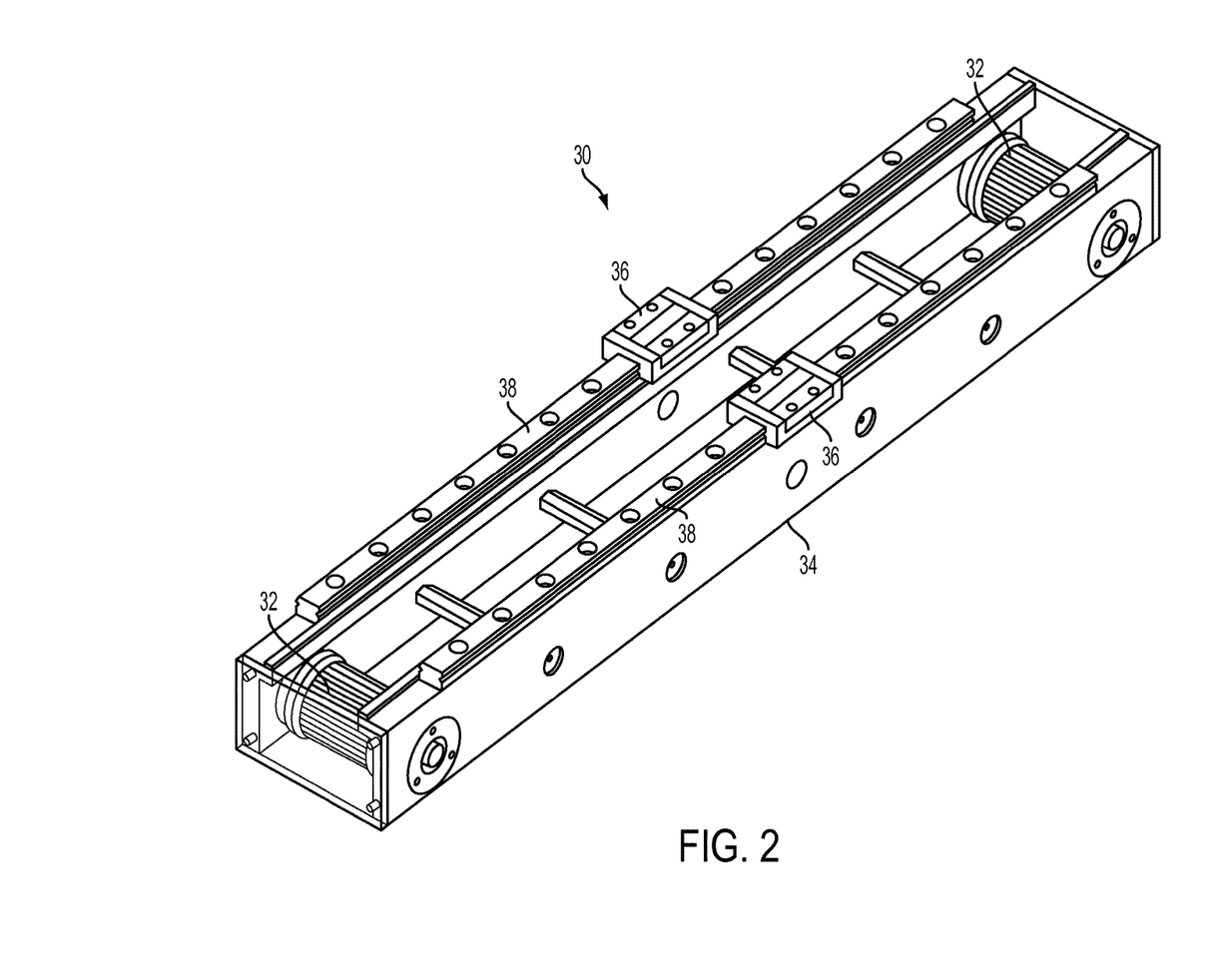
FIG. 2 is a perspective view of a descent mechanism of the childbirth simulator.

FIG. 2 is a perspective view of a descent mechanism of the childbirth simulator. The descent mechanism 30 is a driven mechanism that may utilize for example a timing belt (not shown) and two timing pulleys 32 mounted on a frame 34, or any other components which are known in the art for driving descent of the fetus through the childbirth canal of the pelvis 16. The frame 34 could have a U-shaped cross-section as shown on FIG. 2, or any appropriate shape. The timing belt is fixed to a carriage 36 that travels along two parallel linear rails 38 mounted on the frame 34. One of the timing pulleys 32 is fixed to a motor (not shown), for example a brushless direct current motor or a stepper motor, which drives the mechanism. The motor is selected to withstand pushing and pulling forces of 20 pounds. An encoder or linear potentiometer (not shown) is used to continuously sense descent location by tracking a position of the carriage 36 along the rails 38. The descent mechanism 30 is configured to provide about eight to nine (8-9) inches or about 23 cm of travel of the carriage 36 along the rails 38.

Figure 3A:
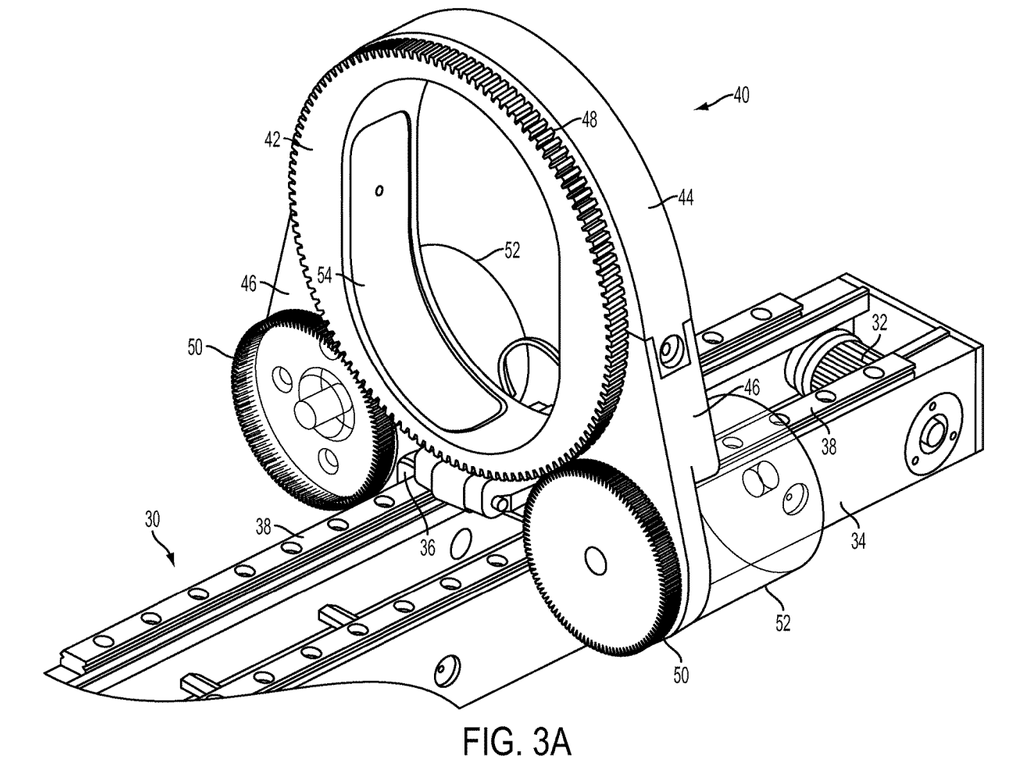
FIG. 3A is a detailed perspective view of the descent mechanism and of a rotation mechanism.
Figure 3B:
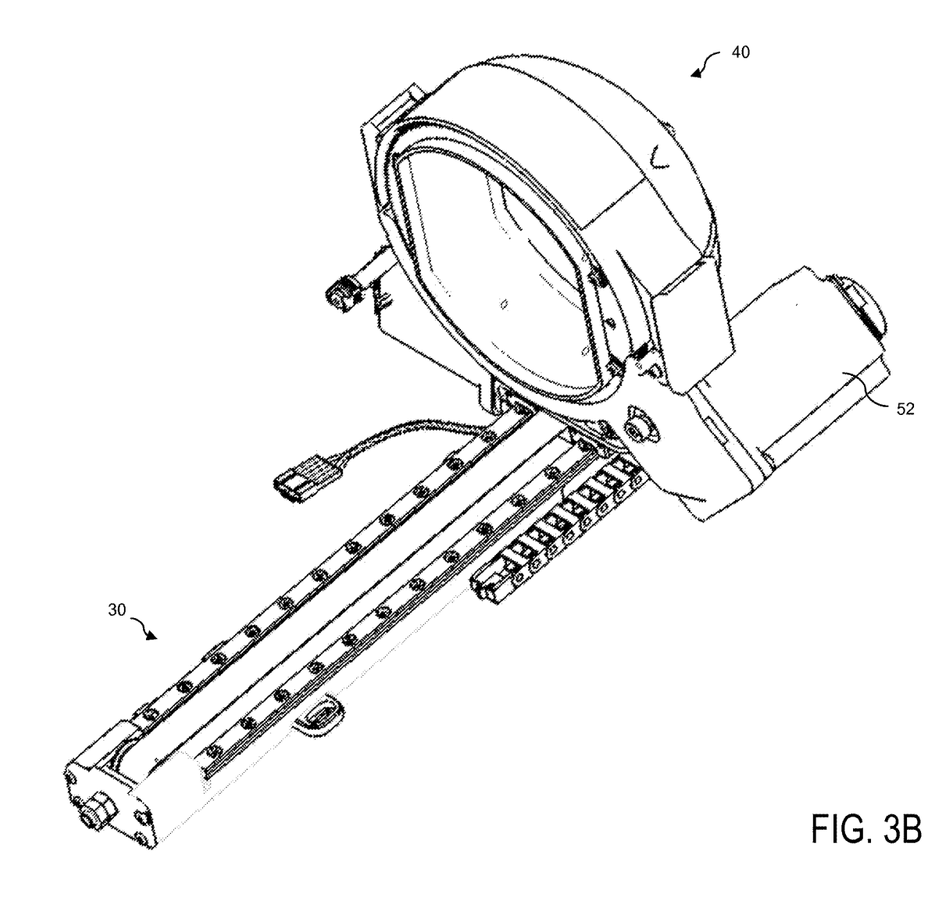
FIGS. 3B, 3C and 3D are detailed perspective views of the descent mechanism and of a rotation mechanism according to another embodiment.
Figure 3C:
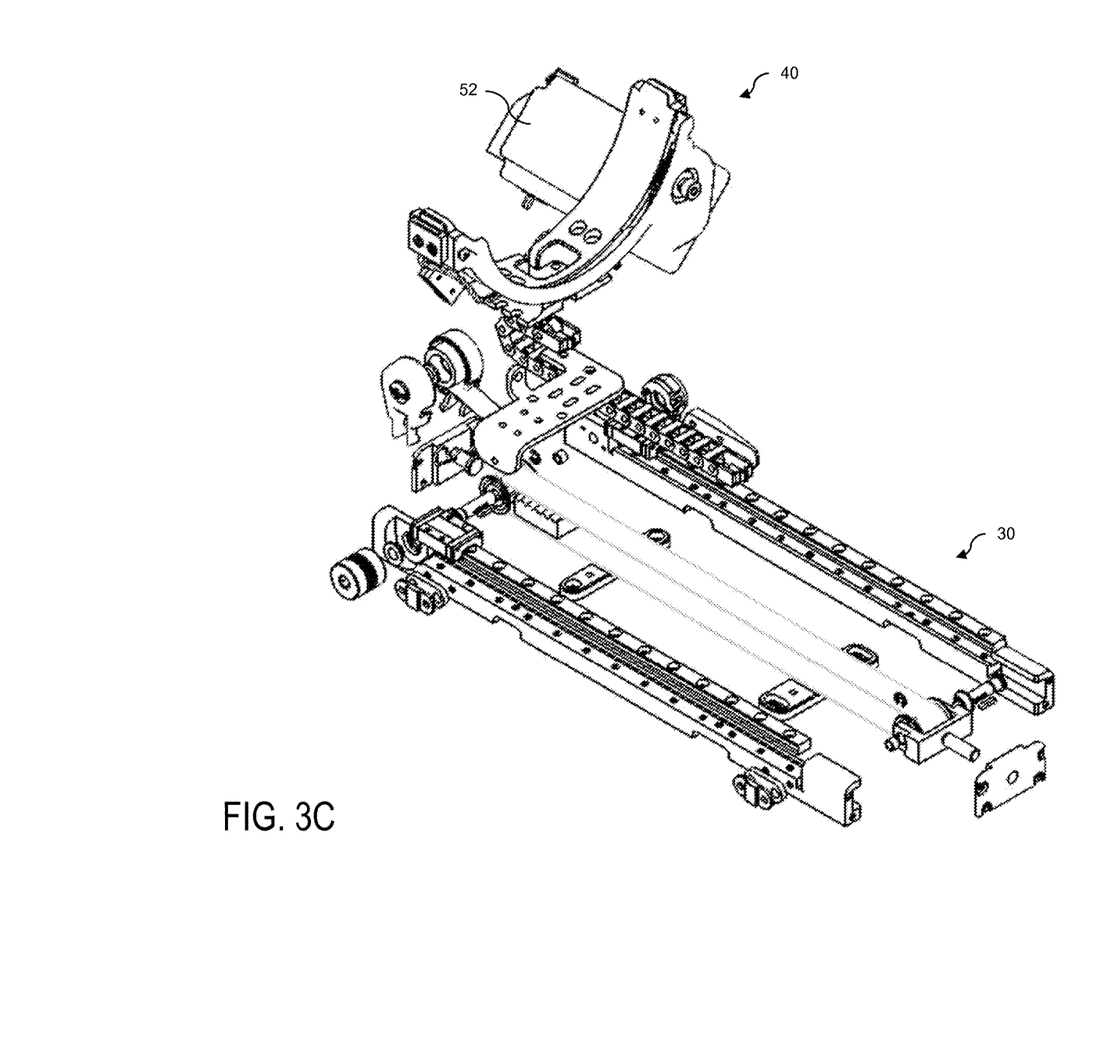

FIGS. 3A, 3B, 3C and 3D are detailed perspective views of the descent mechanism and of a rotation mechanism. FIG. 3A and FIGS. 3B-D respectively represent two alternatives of a rotation mechanism 40. The rotation mechanism 40 is fixed to the carriage 36 (visible in FIG. 3A, but not in FIGS. 3B and 3C) of the descent mechanism 30. The rotation mechanism 40 comprises a rotating ring 42 captured within a housing, which in the embodiment of FIG. 3A includes an upper housing 44 and a lower housing 46. The inside of the rotating ring 42 is ovoid shaped such that the fetus 22 can be inserted in two (2) different ways for each style of birth, including vertex and breech. An outer flange of the rotating ring 42 has a gear profile 48 that meshes with two (2) driving pinions 50, as shown on FIG. 3A, but only one driving pinion could be used. The rotation mechanism illustrated in FIGS. 3B-D uses a single pinion (not represented in the Figures). The pinions 50 are secured to motors 52 that are mounted to the lower housing 46 as shown in FIG. 3A. Alternatively, only one motor 52 may be used when a single driving pinion is used as shown in FIGS. 3B and 3C. An encoder (not shown) located on the back of one of the motors 52 senses a rotational position of the fetus 22. The rotation mechanism 40 is capable of rotating 360 degrees or above. Inside the rotating ring 42 are one or several (at least two (2) pneumatic bladders 54 shown in FIG. 3A). When inflated, the bladder(s) 54 act as a fetal clamp holding the fetus 22 during the descent (by applying a pressure on the fetus 22), and releasing the fetus 22 during the final stage of the delivery process (by releasing the pressure on the fetus 22), i.e. extraction of the body and legs of the fetus 22 from the birth canal.

Figure 3D:
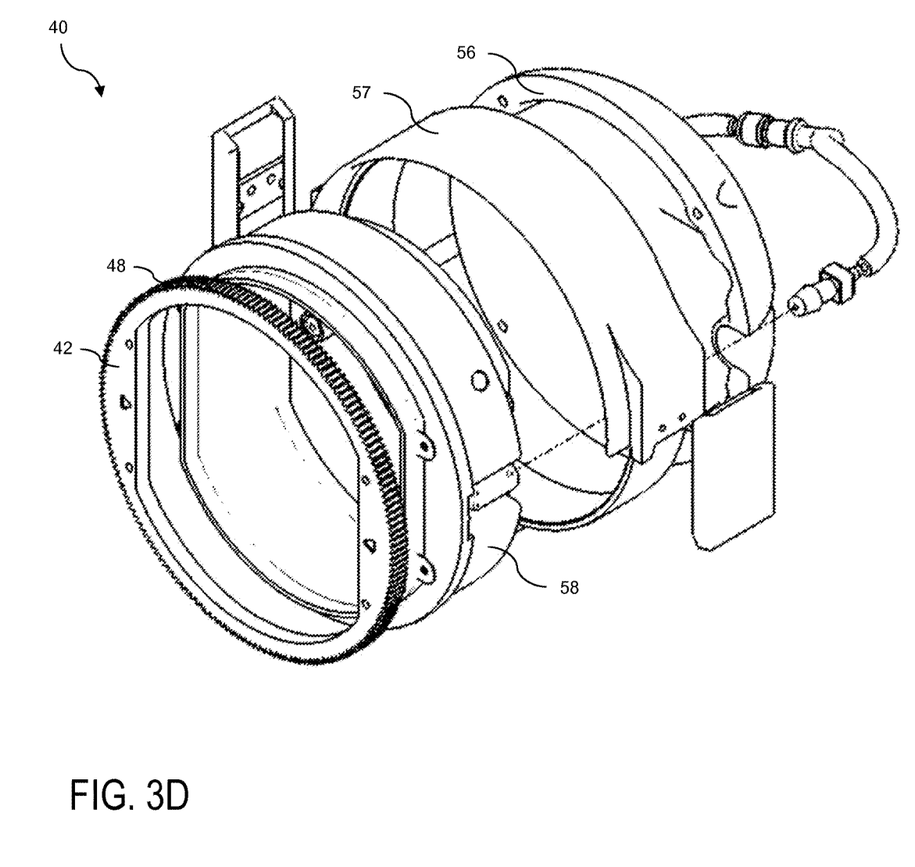

The fetus 22 may be partially or integrally inserted in a basket 56 shown in FIG. 3D but not in FIG. 3A, for simulating the placenta of the mother. The basket 56 may consist of a net, of a bag or any other means allowing a realistic simulation of the size and shape of the placenta. The basket 56 may be attached to the rotation mechanism 40, for example to the upper housing 44 shown in FIG. 3A, and extending in a direction opposite to the birth canal 24. Alternatively, as shown in FIG. 3D, the basket 56 may be attached to the rotation mechanism 40 via a cover 57, the cover 57 being secured to a ring 58 containing the pneumatic bladder(s), the ring 58 being secured to the rotating ring 42. In yet another alternative, the basket 56 is not attached to the rotation mechanism 40, but may be directly attached to the fetus 22, and extending in a direction opposite to the birth canal 24.

Figure 4:
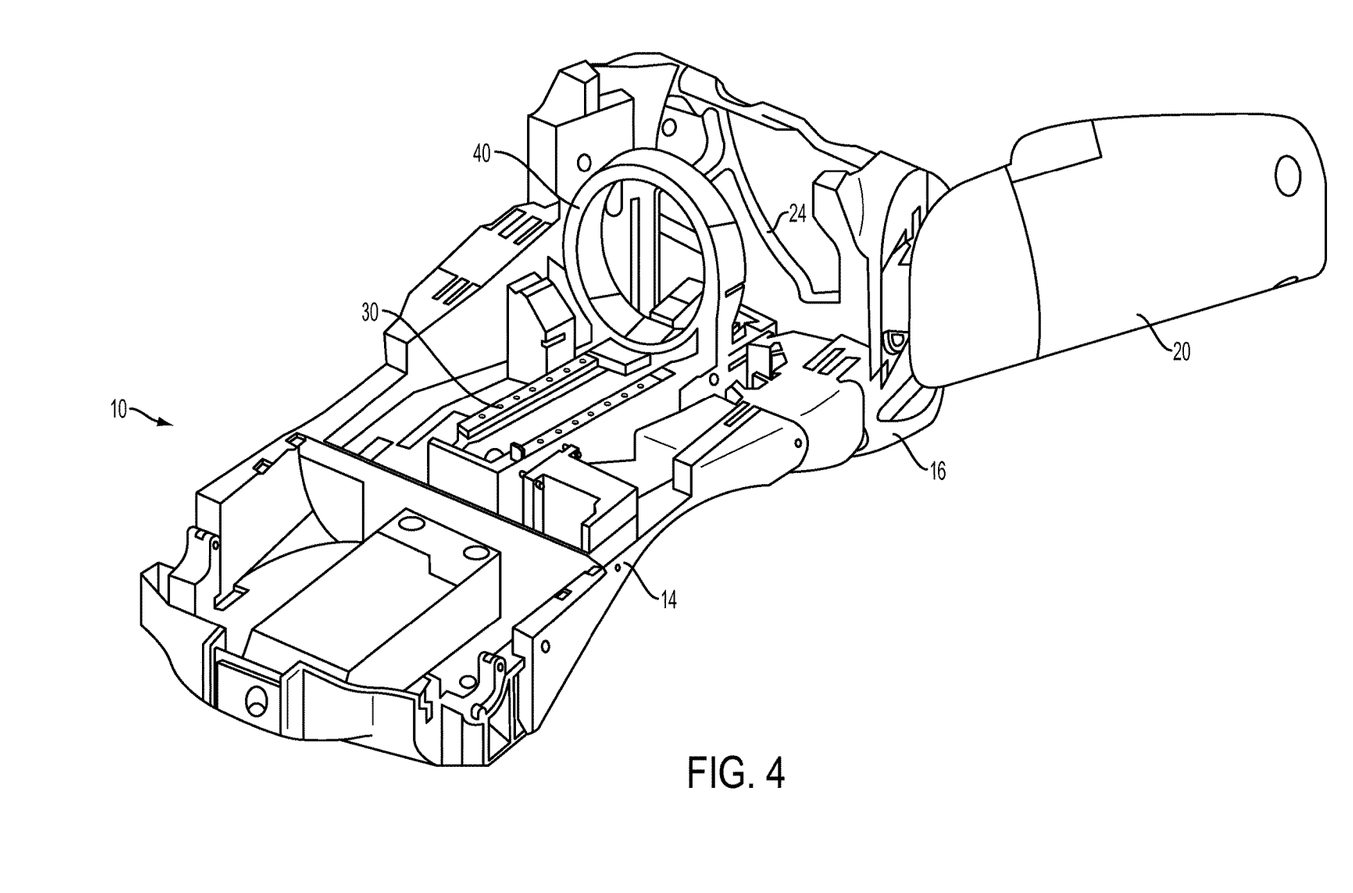
FIG. 4 is a rear, right perspective view of the childbirth simulator including the descent mechanism and the rotation mechanism.

FIG. 4 is a rear, right perspective view of the childbirth simulator including the descent mechanism and the rotation mechanism. The Figure shows how the descent mechanism 30 and the rotation mechanism 40 are integrated within the torso 14 of the mannequin 10 such that the descent mechanism 40 terminates proximally to the birth canal 24, the rotation mechanism 40 being substantially aligned with a perimeter of the birth canal 24. The descent mechanism 30 may be activated independently of the rotation mechanism 40, allowing simulations where only the descent mechanism 30 operates, and simulations where the descent mechanism 30 and the rotation mechanism 40 operate simultaneously.

In an embodiment, the mannequin 10 is instrumented and includes a plurality of sensors, including the aforementioned encoders. These sensors are linked to one or more processors, computers and like machines that form, with the childbirth simulator, a childbirth simulation system. Without limitation, examples of sensors incorporated within the mannequin 10 may comprise a fetal head traction sensor, a fetal head torque sensor, a fetal neck traction sensor, a sensor cervix pressure applied by the fetus 22, a longitudinal fetal position sensor, a rotational fetal position sensor, a cervix dilation sensor, a cervix effacement sensor, a uterine pressure sensor, a suprapubic pressure sensor, one or more sensors of manual pressure applied at various points on the mannequin 10, one or more mannequin 10 position sensors. A particular embodiment may comprise any combination of these sensors. In the context of the present disclosure, at least some of the sensors provide actual data. For example the fetal head traction sensor can provide a measure of traction on the head of the anatomical model of the fetus 22. In another example, the fetal neck traction sensor can provide a measure of the pressure applied by the descent mechanism 30 and/or rotation mechanism 40 on the neck of the fetus 22. The fetal neck traction sensor can also provide a measure of the pressure applied on the neck of the fetus 22 by a user of the childbirth simulator pushing the head of the fetus 22 during the simulation. Additionally, the sensors may concurrently measure applied traction and applied pressure by a trainee or user of the childbirth simulator.

Figure 5:
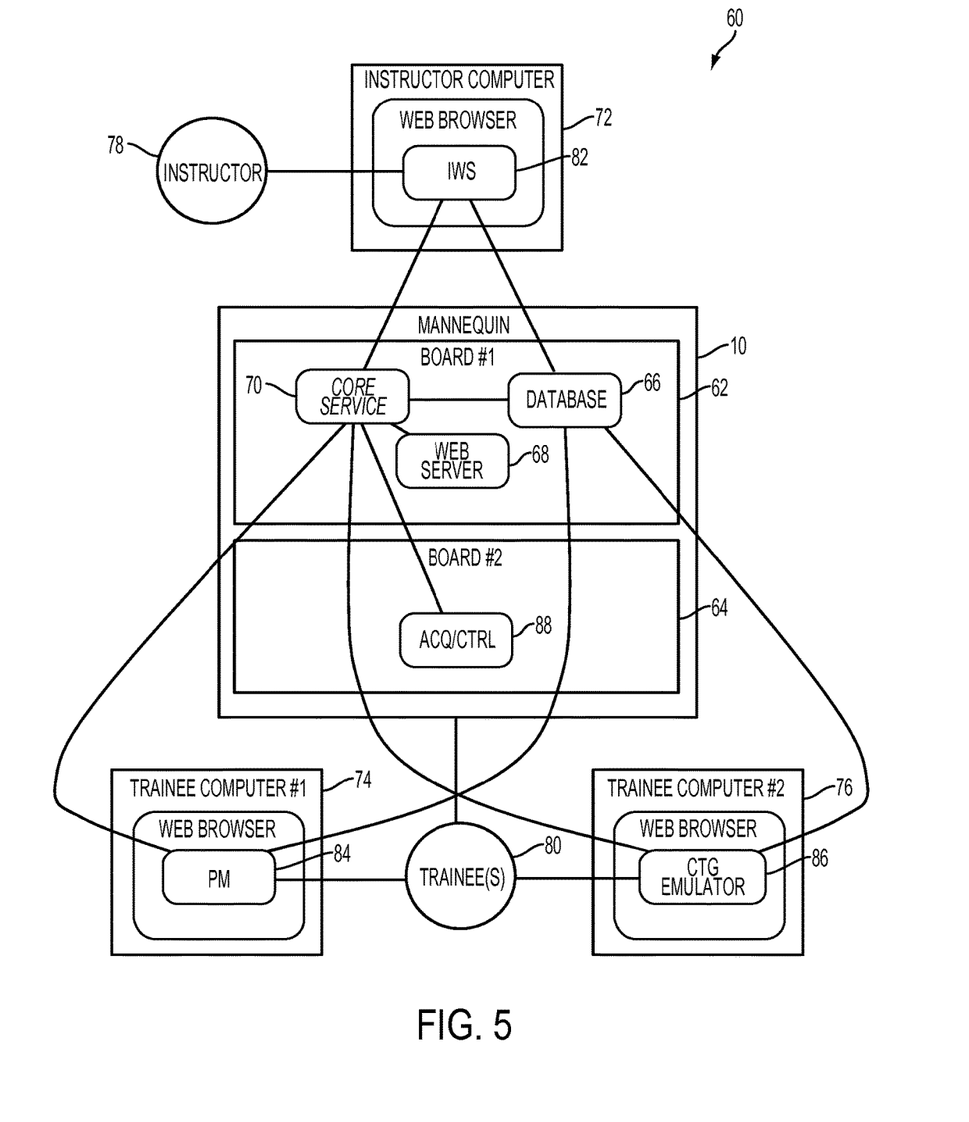
FIG. 5 is a block diagram showing interaction of the childbirth simulator with an instructor computer and with trainee computers according to an embodiment.

Further integration of the CBS and its components is described in FIG. 5, which is a block diagram showing interaction of the childbirth simulator with an instructor computer and with trainee computers according to an embodiment. In this embodiment, the CBS introduced in earlier Figures is driven by computational models of physiology of the mother and fetus and a collection of state machines. The simulator detects interventions performed by trainees, which are recorded and may trigger changes to the simulation. Included among the detected interventions is, for example, traction applied to assist delivery of the fetus, the magnitude of which is quantified.

A childbirth simulation system 60 includes the CBS including the mannequin 10. A server component and multiple client components communicate with the mannequin 10. The server component may reside inside the childbirth simulation system 60, and client applications may run on hosts that join with the mannequin 10 to form a simulation network.

The childbirth simulation system 60 may comprise two computers 62 and 64, for example single board computers that connect via any known communication means, wired or wireless, such as for example Ethernet, USB, Controller Area Network (CAN) bus, Bluetooth™, Wi-Fi, WLAN, cellular, etc. The childbirth simulation system 60 may comprise additional peripheral boards (not shown) connected to various sensors, actuators and motors, to monitor and control various features such as pulses, chest movement and bleeding. The two computers 62 and 64 are operably connected to the mannequin 10 and with its actuators, motors and sensors. One or both of the computers 62 and 64 may be physically integrated within the mannequin 10. They may alternatively be remotely located. FIG. 5 shows that the two computers 62 and 64 are at least logically integrated with the mannequin 10.

The server component residing in the computer 62 comprises a database 66 for simulation contents storage, a web server 68 for contents retrieval and a core service 70 for real-time data generation.

The childbirth simulation system 60 may also comprise an instructor computer 72 and two (2) trainee computers 74, 76, which are connectively coupled to the core service 70 and to the database 66. An instructor 78 operates the instructor computer 72. A trainee 80 obtains information from the trainee computers 74, 76 and performs manual operations on the mannequin 10.

Though not required in all embodiments, the childbirth simulation system 60 may be implemented as a mobile, untethered operation. The childbirth simulation system 60 could be self-contained.

Optionally, the instructor 78 and the trainee 80 may be requested to provide authentication before gaining access to the childbirth simulation system 60.

Software components present in the childbirth simulation system 60 may thus include:

Instructor Workstation (IWS) 82—a Flash™ application running in a web browser on the instructor computer 72, which provides an interface for the instructor 78 to create training scenarios and conduct simulation training.

Patient monitor (PM) 84—a Flash™ application running in a web browser on the trainee computer 74, which emulates a bedside patient monitor, displaying vital signs of the simulated patient and other physiologic data, such as electrocardiogram waveforms.

CTG Monitor Emulator 86—a Flash™ application running in a web browser on the trainee computer 76, which emulates a cardiotocograph (CTG), also known as an electronic fetal monitor or maternal-fetal monitor, displaying fetal heart rate, uterine activity (contractions), and maternal vital signs.

Core Service 70—a software application running on the computer 62, optionally embedded in the mannequin 10, responsible for running computational models of physiology and training scenarios and for communication with the IWS 82, PM 84, CTG monitor emulator 86, and with a Firmware Application Layer.

Firmware Application Layer—acquisition and control software 88 running on one or both of the computers 62 and 64, implementing sensor data acquisition and actuator control.

Hardware Abstraction Layer—low level software running on one or both of the computers 62 and 64, supporting the acquisition and control software 88 in implementing sensor data acquisition and actuator control.

MySQL™—a database server running on one or both of the computers 62 and 64 and utilized by the core service 70, IWS 82, PM 84, and CTG monitor emulator 86.

PHP—a script interpreter running on the computers 62 and 64.

Apache—software platform of the web server 68.

Adobe™ Flash Player™—a web-browser plugin running on the instructor computer 72 and on other computers of the childbirth simulation system 60.

Software client applications such as the IWS 82, the PM 84 and the CTG emulator monitor 86 provide the instructor 78 and the trainee 80 with visual representations of parameters of the ongoing simulation. The IWS 82 provides simulation controls such as start and stop of a simulation. The PM 84 application provides waveform and vital sign display. CTG emulator monitor 86 specifically provides monitoring of a fetus uterine activity (UA) and fetal heart rate (FHR). Both the PM 84 and the CTG emulator monitor 86 are designed for trainee access. In an embodiment, the software client applications are web-based. So that no specific installation is required at the client side other than provision of an ordinary web browser.

Educational contents are represented as simulated clinic experiences (SCE). An SCE definition includes a patient that is defined by various physiologic parameters and multiple scenarios that simulate the medical conditions.

The SCEs are stored in the database 66. The core service 70 provides mathematical simulation of the physiologic models and generates real-time physiologic data to feed back to the software client applications.

A typical simulation involves the following operations, some of which may be executed in a variable order, some of the operations possibly being executed concurrently, some of the operations being optional:

A) The core service 70 starts and sets up a transmission control protocol (TCP) server for client application connections.
B) The instructor 78 opens a web browser and type in the uniform resource locator (URL) to access the server side of the web server 68.
C) A Flash™ object is loaded to the IWS 82 and starts to communicate with the web server 68 via Hypertext Preprocessor (PHP) common gateway interface (CGI).
D) The Flash™ object accesses the database 66 via PHP, and fetches the educational contents, and displays the contents on the IWS 82.
E) The instructor 78 starts the simulation.
F) The Flash™ object starts to communicate with the core service 70 and conducts the command.
G) The core service 70 accesses the database 66 to fetch an educational content and to feed it to the mathematical model.
H) The simulation starts.
I) The trainee 80 stays close to the mannequin 10 and to the computers 74, 76, and monitors physiologic signals via either PM 84 or CTG emulator monitor 86.
J) The instructor 78 adjusts patient control via the IWS 82, or loads a training scenario from the database 66, via the web server 68, into the simulation.
K) The Flash™ object conducts the commands to the core service 70.
L) The simulation is ongoing.
M) The trainee 80 checks pulse, does cardiopulmonary resuscitation (CPR), checks eye blinking, and performs specific childbirth procedures as directed by the training scenario.
N) Interventions done by the trainee 80 are fed back to the core service 70, which may impact next events in the training scenario.
O) The core service 70 continues to feed data to the client applications and saves simulation results and logs into the database 66.
P) The instructor 78 stops the simulation.
Q) The Flash™ object sends a stop command to the core service 70, and the simulation stops.

In a non-limiting embodiment, a typical simulation command comprises the following operations:

i) The instructor 78 clicks on a heart control on the IWS 82.
ii) The instructor 78 sets the heart rate (HR) to 120 using a text field or slider of the IWS 82.
iii) The Flash™ object wraps the "set HR 120" command into an appropriate format and sends it to the core service 70.
iv) The core service 70 gets the command and makes it into a data block in an internal memory.
v) A model running in the core service 70 picks up the new data and drives the simulation.
vi) The core service 70 logs these events in the database 66.

As mentioned hereinabove, the CBS can be integrated in a full human body simulator (HBS). The HBS may in turn additionally provide a variety of simulation components to simulate additional functions of the human body related to and/or affected by childbirth. Table 2 provides a detailed list of features of a fully integrated CBS; this list is not limiting and some embodiments may comprise more or less than the features set of Table 2.

TABLE 2

Detailed list of features of the Childbirth Simulator

| Name | Description |
| --- | --- |
| External Cephalic Version | External cephalic version can be performed on the mannequin to rotate the fetus in the uterus. |
| Mobile Fetal Heart Sounds | Fetal heart sounds emanation source changes appropriately with the fetal delivery progress. For instance, a location where the fetal heart can be heard changes as the fetus descends and rotates to more properly reflect reality. |
| Anatomically Correct Maternal Pelvis | The simulator's pelvis is of gynecoid shape and has anatomically correct dimensions and palpable landmarks including pubic bone and the ischial spines. |
| Palpable Uterine Contractions | Uterine contractions can be detected by palpating the fundus. Time interval between uterine contractions may vary from 10 minutes to 1 minute with less than 4 minutes during normal labor. Each contraction lasts between 30 to 90 seconds with an average of about 1 minute. Contraction generates between 20 to 60 mm of mercury (Hg) of amnionic fluid pressure with an average of about 40 mm Hg. Hypercontactility refers to a smaller than 2 minutes interval between contractions or contractions lasting more than 2 minutes (hypertonus uterus). "Rock-hard" uterus refers to a contraction above a predetermined pressure level. |
| Cervix | The mannequin has a cervix that can be assessed by vaginal examination. Various stages of dilation (0 to 10 cm) and effacement (from 0% to 100%) are represented. |

TABLE 2-continued

Detailed list of features of the Childbirth Simulator

| Name | Description |
| --- | --- |
| Fetal Heart Sounds | The simulator produces fetal heart sounds that are audible by auscultation. |
| Fetal Descent and Rotation | The fetus is delivered by an active mechanism that properly responds to maneuvers used to assist delivery. |
| Suprapubic Pressure Support | The mannequin can withstand the application of suprapubic pressure to relieve shoulder dystocia. |
| McRoberts Maneuver Detection | The mannequin detects the correct execution of McRoberts maneuver to resolve shoulder dystocia. |
| Rubin II maneuver Support | The simulator supports application of the Rubin II maneuver to resolve shoulder dystocia. |
| Wood's Screw Maneuver Support | The simulator supports the application of the Wood's screw maneuver. |
| Postpartum Vaginal Bleeding | The mannequin can be made to bleed from the vagina after delivery. |
| Episiotomy | Episiotomy can be performed on the mannequin. |
| Intrapartum Vaginal Bleeding | The mannequin can be made to bleed from the vagina while in labor. |
| Delivery of the Posterior Arm | The simulator supports the delivery of the posterior arm to resolve shoulder dystocia. |
| Wood's Screw Maneuver Detection | The simulator detects proper application of the Wood's screw maneuver. |
| Detection of Rotational Maneuvers | The mannequin detects and measures the rotational maneuvers performed by the care provider. |
| Breech Delivery, Frank and Complete | A vaginal or C-Section breech delivery can be performed with the simulator for frank and complete breech. |
| Caesarean Section | Simplified Caesarean Section can be performed on the simulator. An appropriate opening is provided to allow the obstetrician to pull out the fetus and the placenta. |
| Suprapubic Pressure Detection | The simulator detects the proper application of moderate suprapubic pressure to resolve shoulder dystocia. |
| Zavanelli Maneuver Detection | The mannequin detects the execution of Zavanelli maneuver. |
| Rubin II Maneuver Detection | The simulator detects proper application of the Rubin II maneuver. |
| Breech Delivery, Single and Double Footling | A C-Section breech delivery can be performed with the simulator for single and double footling breech presentation. |
| Childbirth Breathing Pattern | The simulator provides a childbirth supportive breathing pattern: high respiratory rate on contraction. |
| Chest Excursion, Asymmetric | The mannequin's chest may move asymmetrically with breathing. |
| CPR Analysis | The simulator analyzes chest compression. |
| Spontaneous Breathing | The simulator is able to spontaneously breathe to a given respiratory rate exhibiting appropriate perceptible cues. |
| Normal Breathing Pattern | The simulator provides a normal breathing pattern. |
| International Operation | The simulator complies with the regulatory requirements of various countries. |
| IV Therapy Support | The mannequin can receive IV Therapy. |
| Right Mainstem Intubation Detection | The simulator can detect right mainstem intubation when an endotracheal tube is inserted. |
| Intubation Detection | The system detects proper intubation. |
| CTG MNIBP User Interface (UI) | The emulated CTG provides control over the display of the Maternal Non-Invasive Blood Pressure (MNIBP). |
| CTG TOCO ZERO UI | The emulated CTG provides a Tocodynamometer (TOCO) Zero reset capability. |
| Fetal Head with realistic Fontanels | The fetal head deforms realistically under pressure. |
| CTG Historical Data Generation | The simulator provides a mechanism whereby relevant CTG related data just anterior to a scenario start can be generated. |

TABLE 2-continued

Detailed list of features of the Childbirth Simulator

| Name | Description |
|---|---|
| Fetal Airway Suctioning | The fetal nose and mouth accommodate suctioning. |
| Fetal Spiral Scalp Electrode Placement | A spiral ECG electrode can be attached to the fetal scalp. |
| Trendelenberg Detection | The simulator detects positioning of the mannequin in the Trendelenberg position. |
| Fetal Applied Torque Display | The instructor interface dynamically displays information on the torque forces applied by the trainee to the fetus head and neck. |
| Umbilical Cord | The fetus has a realistic umbilical cord that may be positioned as prolapsed or nuchal and can be cut. |
| Pulses, Brachial | The simulator has bilateral brachial pulses. |
| Breath Sounds | The simulator's breathing can be made audible for auscultation. The breaths sounds are synchronized with the respiratory cycle and have an audible volume control. Sounds can be positioned across one or more of the following sites: Bronchial, Right/Left (expansion of current capability) - 2 channels, 2 sites (shares upper heart sound speakers); Bronchovesicular, Right/Left Upper Posterior - 2 channels, 4 sites; Vesicular, Right/Left Upper Anterior - 2 channels, 4 sites; Vesicular, Right/Left Lower Anterior - 2 channels, 4 sites; Vesicular, Right/Left Lower Posterior - 2 channels, 4 sites; Bronchovesicular, Sternum (expansion of current capability) - 1 channel, 1 site. Normal sound is included. |
| CTG Control UI | The Emulated CTG provides a set of controls that allows its user to direct its operation. |
| Alarm Control UI | The emulated CTG provides the capability to set, clear, and control alarms on physiological data. |
| CTG Paper strip | The emulated CTG provides the capability to display on screen a reproduction of the paper strip produced by real CTG with Fetal Heart Rate (FHR) and optional Maternal Heart Rate (MHR) graphs in a top grid part, Uterine Activity (UA) graph in a lower grid part. |
| CTG Alarms | The emulated CTG provides the capability to set and trigger alarms for out of stated bounds physiological data. |
| Vocalization, Live | The simulator can mix-in the vocalization sounds, speech and vocal sounds created live by an operator via wireless microphone. Live speech and sounds are subjected only to the vocalization adjustable volume control. Live speech and sounds are not disabled by apnea or loss of consciousness or repeated based on a specified pattern. |
| Urinary Catheterization | The simulator has a urinary bladder that can be filled with fluid and catheterized. |
| Blinking | The simulator's eyes blink. |
| Vocalization | The simulator produces prerecorded speech and vocal sounds. Speech can be localized to a given language. |
| Positive Pressure Ventilation | The mannequin can be mechanically ventilated, exhibiting realistic airway/bronchial resistance, lung/chest compliance, and chest excursion. The simulator detects ventilation. |
| Reactive Pupils | The simulator's pupils can be set to fixed size or made to react automatically to light. |
| Left Lateral Tilt Detection | The simulator detects positioning of the mannequin in the left lateral tilt position. |
| Sphygmomanometry | The simulator's blood pressure can be evaluated by sphygmomanometry. |
| Pulses, Radial | The simulator has bilateral radial pulses. |
| Pulses, Carotid | The simulator has bilateral carotid pulses. |
| SpO2 Probe | A simulated oxygen saturation (SpO2) finger probe can be physically placed on the mannequin, enabling the display of optoplethysmography data on a simulated patient monitor. |
| Seizure | The simulator exhibits seizure: arm, eye, jaw movement, and stertorous inhalation. |

TABLE 2-continued

Detailed list of features of the Childbirth Simulator

| Name | Description |
|---|---|
| Custom Vocalizations SCE Support | The SCE system maintains vocalization integrity of exported SCE that uses custom vocalization. |
| CBS Script Trigger | The system accepts CBS related events as conditional trigger within a scenario script. |
| Scripted Fetal Descent and Rotation | The system provides scripted control over fetal descent and rotation. |
| CPR Effectiveness Assessment | The instructor interface provides CPR effectiveness analysis. |
| CBS Data Logging | The existing instructor interface is extended to capture the evolution over time of CBS specific physiological and training data for later debriefing and analysis. |
| CBS Event Logging | The existing instructor interface is extended to log notification events for CBS specific conditions or change of states. |
| Fetal Applied Traction Display | The instructor interface dynamically displays information on the traction forces applied by the trainee to the fetus head and neck. |
| 12-Lead ECG Report | The maternal patient monitor provides 12-Lead ECG reporting capabilities. |
| IV Access, Forearm | Intravenous cannulas can be introduced into the veins of the forearm. |
| APGAR Score | The physiological models generate Appearance, Pulse, Grimace, Activity, Respiration (APGAR) scores for the newly born fetus. |
| CTG User Configuration UI | The emulated CTG provides the capability to locally set some behavioral aspects. |
| CTG Configuration UI | The simulator provides the capability to configure the operation and the look of the emulated cardiotocograph (CTG). |
| Articulated Fetal Body | The fetal body articulates realistically for the following joints:<br>neck;<br>shoulders;<br>elbows;<br>hips;<br>knees. |
| Postpartum Hemorrhage UI | The instructor interface provides control over post-partum vaginal bleeding. |
| Neonate Crying UI | The instructor interface provides control over neonate crying. |
| Maternal Heart UI | The instructor interface provides control over the maternal heart parameters; e.g. cardiac rhythms, heart sounds. |
| Fetal Soft Tissue | The fetal body is realistically pliable such that it is possible to differentiate between cephalic and breech delivery. |
| Pulses UI | The instructor interface provides control over pulses settings |
| Audible Breathing UI | The instructor interface provides control over audible breathing settings. |
| Breath Sounds UI | The instructor interface provides control over breath sounds settings. |
| Chest Excursion UI | The instructor interface provides the capability to control operation of the chest excursion mechanism. |
| Seizure UI | The instructor interface provides the capability to control operation of the seizure mechanism. |
| Eye Control UI | The instructor interface provides control over the mannequin eyes. |
| Vocalization UI | The instructor interface provides control over the vocalization playback parameters. |
| Emulated Cardiotocograph | The simulator includes an emulated cardiotocograph that provides the most common features found on typical real CTG monitors. It displays mother and fetus physiological data as numeric values along with an on-screen reproduction of the paper strip produced by real CTG printer. It handles singleton. |
| Live vocalization UI | The instructor interface provides control over the live vocalization parameters. |
| Laboratory Results UI | The instructor Interface supports use of laboratory results within a training session. |
| Physiological Data Display | The existing instructor interface is extended to display selected additional CBS physiological data values. |

TABLE 2-continued

Detailed list of features of the Childbirth Simulator

| Name | Description |
|---|---|
| ECG Signals Display | The instructor interface can display up to 12-Lead ECG signals; e.g. 3-Lead, 5-Lead and 12-Lead traces are available |
| Caesarean Section, High Fidelity | A high fidelity caesarean section can be performed on the simulator. |
| CBS Related Historical Data | The patient simulator instructor interface historical data management can manage the CBS related data. |
| Instructor interface CBS Support | The patient simulator instructor interface supports the CBS simulator. View(s), control(s), and physiological data specific to the CBS are provided. |
| Operation Mode UI | The instructor interface provides control and visualization over the operating mode of the mannequin. |
| Fetal Heart Sounds UI | The instructor interface provides controls over the fetal heart sounds. |
| Cervix UI | The instructor interface provides control and visualization over the cervix operation. |
| Shoulder Dystocia UI | The instructor interface provides control over Shoulder Dystocia. |
| Fetal Descent and Rotation UI | The instructor interface provides control and visualization over fetal descent and rotation. |
| Exhalation | The mannequin exhales air (or any other inhaled gas) such that it minimally provides required cues to stimulate ventilator. |
| Chest Compression Detection | The simulator detects and properly reacts when chest compression is applied. |
| Chest Compression | Chest compression can be performed on the mannequin. |
| Emulated Maternal Patient Monitor | The simulator provides an emulated patient monitor for the maternal vital signs. |
| Airway | The simulator has an anatomically correct airway. |
| Electrical Therapy | The simulator can be paced, cardioversed and defibrillated. |
| Audible Breathing | The simulator's breathing can be made audible for unaided listening. The breathing sound is synchronized with the respiratory cycle and has an audible volume control. |
| 5-Lead ECG, Real | A real 5-lead electrocardiograph can be connected to the simulator. This includes the capability to connect a real 3-Lead electrocardiograph. |
| Heart Sounds | The simulator produces realistic heart sounds associated with a variety of conditions at the 4 precordial auscultation areas. Each of the 4 auscultation sites is independently controllable. |
| Catheterization Immediate Urine Output | The mannequin provides an immediate urinary output upon catheter insertion. |
| IV Access, Dorsal Hand | Intravenous cannulas can be introduced into the veins of the dorsum of the hand. |
| Laboratory Results | The simulator provides a mechanism whereby patient laboratory results can be communicated. |
| Chest Excursion, Spontaneous | The simulator's chest rises and falls with spontaneous breathing. |
| IV Drug Recognition | Intravenous drugs administered to the mannequin are automatically detected. |
| Fraction of Inspired Oxygen Sensing | The simulator senses and measures the amount of oxygen provided to it. |
| Rectum | The simulator has an anal sphincter and rectal cavity for administration of some amount of medicine (micro-enema and suppository). |
| Epidural | The simulator supports the epidural procedure. |
| Articulated Maternal Body | The simulator provides an articulated maternal full-body to allow a variety of birthing positions for: interventions for delivery complications; interventions for maternal emergencies; realistic patient transport. The maternal body is an implementation of a human body simulator with added maternity specific features. |
| Leopold's Maneuvers | Leopold's maneuvers can be performed on the mannequin to determine the position and lay of the fetus in the uterus and to estimate fetal weight. |

TABLE 2-continued

Detailed list of features of the Childbirth Simulator

| Name | Description |
| --- | --- |
| Vagina | The mannequin has a realistic birth canal. |
| Vulva/Perineum | The mannequin has external female genitalia and perineum. Provides an intact perineum and one for episiotomy. |
| Shoulder Dystocia | Descent of the fetus can be halted by shoulder dystocia. |
| McRoberts Maneuver Support | The McRoberts maneuver can be applied to the mannequin. |
| Zavanelli maneuver Support | Zavanelli maneuver can be applied to the mannequin. |
| Postpartum Uterus | The mannequin has a palpable postpartum uterus. |
| Inverted Uterus | The mannequin can be configured with a fully or partially inverted uterus. |
| Intact Placenta | The placenta can be delivered in an intact state. |
| Fragmented Placenta | The placenta can be delivered in a fragmented state. |
| Palpable Fontanels and Sagittal Suture | Anterior and posterior fontanels and the sagittal suture are palpable on the fetal head. |
| Forceps Application | Forceps can be applied to the fetus to assist delivery. |
| Vacuum Extractor Application | A vacuum extractor can be applied to the fetus to assist delivery. |
| Physiological Models | The simulator may be driven by models of maternal and fetal physiology. |
| Untethered Operation | The simulator operates untethered. |
| Crying | The neonate cries. |
| Fetal Head Torque Sensing | The simulator senses the magnitude of torque applied by the care taker on the fetal head and indicates when excessive force is used. No force is reported for spontaneous activity. |
| Fetal Neck Traction Sensing | The simulator senses the magnitude of traction force applied by the care taker on the fetal head and indicates when excessive force is used. No force should be reported for spontaneous activity. |

Those of ordinary skill in the art will realize that the description of the childbirth simulator and its applications are illustrative only and are not intended to be in any way limiting. Other embodiments will readily suggest themselves to such persons with ordinary skill in the art having the benefit of the present disclosure. Furthermore, the disclosed childbirth simulator may be customized to offer valuable solutions to existing needs and problems of providing a realistic childbirth simulation.

In the interest of clarity, not all of the routine features of the implementations of the childbirth simulator are shown and described. It will, of course, be appreciated that in the development of any such actual implementation of the childbirth simulator, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of biomedical engineering having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A childbirth simulator for moving an anatomical model of a fetus inside a human model simulator having a birth canal, comprising:
   a descent mechanism for moving the anatomical model of the fetus longitudinally towards the birth canal of the human model simulator, the descent mechanism comprising a frame, two rails mounted on the frame and a carriage traveling along the two rails; and
   a rotation mechanism comprising:
      a housing mounted to the carriage of the descent mechanism; and
      a rotating ring captured within the housing, an inside of the rotating ring being ovoid shaped for allowing insertion of the anatomical model of the fetus in two different ways in the rotating ring corresponding to two different styles of birth, the inside of the rotating ring comprising at least one pneumatic bladder acting as a fetal clamp when inflated for retaining the anatomical model of the fetus within the rotating ring in either style of birth and while moving the anatomical model of the fetus longitudinally towards the birth canal of the human model simulator.

2. The childbirth simulator of claim 1, wherein the two rails are parallel and linear.

3. The childbirth simulator of claim 1, wherein the frame has a U-shaped cross-section.

4. The childbirth simulator of claim 1, wherein the descent mechanism further comprises:
   two timing pulleys mounted on the frame;
   a timing belt fixed to the carriage; and
   wherein rotation of the two timing pulleys generates longitudinal movement of the timing belt along the two parallel linear rails, thereby moving the carriage along the two parallel linear rails.

5. The childbirth simulator of claim 4, wherein one of the timing pulleys is fixed to a motor for driving the descent mechanism.

6. The childbirth simulator of claim 5, wherein the motor is selected to withstand pushing and pulling forces of 20 pounds.

7. The childbirth simulator of claim 1, wherein the descent mechanism further comprises one of an encoder or a linear potentiometer for continuously sensing descent location by tracking a position of the carriage along the rails.

8. The childbirth simulator of claim 1, wherein the descent mechanism is configured to provide about 8 to 9 inches of travel of the carriage along the rails.

9. The childbirth simulator of claim 1, wherein the rotating ring is capable of rotating 360 degrees or above.

10. The childbirth simulator of claim 1, wherein an outer flange of the rotating ring has a gear profile that meshes with at least one driving pinion, the at least one driving pinion being secured to a motor.

11. The childbirth simulator of claim 10, wherein an encoder located on the motor senses a rotational position of the anatomical model of the fetus.

12. The childbirth simulator of claim 1, further comprising a basket for simulating a placenta, the basket being attached to the rotating mechanism.

13. A childbirth simulator, comprising:
   a human model simulator having a birth canal; and
   a system integrated in the human model simulator for moving an anatomical model of a fetus inside the mannequin comprising:
      a descent mechanism for moving the anatomical model of the fetus longitudinally towards the birth canal of the human model simulator, the descent mechanism comprising a frame, two rails mounted on the frame and a carriage traveling along the two rails; and
      a rotation mechanism comprising a housing mounted to the carriage of the descent mechanism and a rotating ring captured within the housing, the rotating ring being ovoid shaped for allowing insertion therein of the anatomical model of the fetus in two different ways corresponding to two different styles of birth within the rotating ring, the inside of the rotating ring comprising at least one pneumatic bladder acting as a fetal clamp when inflated for retaining the anatomical model of the fetus within the rotating ring in either style of birth while moving the anatomical model of the fetus longitudinally towards the birth canal of the human model simulator.

14. The childbirth simulator of claim 13, wherein the mannequin is an instrumented mannequin.

15. The childbirth simulator of claim 13, further comprising a user interface for controlling a longitudinal movement of the descent mechanism and for controlling a rotation of the rotation mechanism.

16. The childbirth simulator of claim 13, wherein the descent mechanism terminates proximally to the birth canal of the mannequin and the rotation mechanism is substantially aligned with a perimeter of the birth canal.

17. The childbirth simulator of claim 13, further comprising a mechanism located at the bottom of the birth canal for blocking forward movement via the descent mechanism of the anatomical model of the fetus, to simulate shoulder dystocia.

18. The childbirth simulator of claim 13, further comprising a basket for simulating a placenta, the basket being attached to the rotating mechanism.

* * * * *